(12) United States Patent
Huggins

(10) Patent No.: US 9,075,914 B2
(45) Date of Patent: Jul. 7, 2015

(54) ANALYTICS DRIVEN DEVELOPMENT

(71) Applicant: Sauce Labs, Inc., San Francisco, CA (US)

(72) Inventor: Jason Huggins, Oak Park, IL (US)

(73) Assignee: Sauce Labs, Inc., San Francisco, CA (US)

( * ) Notice: Subject to any disclaimer, the term of this patent is extended or adjusted under 35 U.S.C. 154(b) by 82 days.

(21) Appl. No.: 13/633,080

(22) Filed: Oct. 1, 2012

(65) Prior Publication Data

US 2013/0086554 A1    Apr. 4, 2013

Related U.S. Application Data

(60) Provisional application No. 61/541,040, filed on Sep. 29, 2011.

(51) Int. Cl.
*G06F 9/44* (2006.01)
*G06F 11/36* (2006.01)
*G06F 9/445* (2006.01)

(52) U.S. Cl.
CPC ........ *G06F 11/3664* (2013.01); *G06F 9/44526* (2013.01); *G06F 8/34* (2013.01); *G06F 11/3684* (2013.01)

(58) Field of Classification Search
CPC ... G06F 11/3664; G06F 11/3684; G06F 8/34; G06F 9/44526
See application file for complete search history.

(56) References Cited

U.S. PATENT DOCUMENTS

| | | | |
|---|---|---|---|
| 6,470,388 B1 | 10/2002 | Niemi | |
| 6,934,934 B1 | 8/2005 | Osborne | |
| 7,979,846 B2* | 7/2011 | Grechanik et al. | 717/124 |
| 8,307,347 B2* | 11/2012 | Austin et al. | 717/131 |
| 8,375,357 B2* | 2/2013 | Austin et al. | 717/113 |
| 8,661,409 B2* | 2/2014 | Austin | 717/113 |
| 2003/0164850 A1* | 9/2003 | Rojewski et al. | 345/733 |
| 2006/0101404 A1* | 5/2006 | Popp et al. | 717/124 |
| 2009/0007073 A1* | 1/2009 | Huang et al. | 717/124 |
| 2009/0300585 A1 | 12/2009 | Meenakshisundaram | |
| 2010/0030785 A1 | 2/2010 | Wilson | |
| 2010/0223597 A1 | 9/2010 | Jain | |
| 2010/0293525 A1* | 11/2010 | Cifra | 717/109 |
| 2010/0293527 A1* | 11/2010 | Austin et al. | 717/113 |
| 2012/0290527 A1* | 11/2012 | Yalamanchilli | 707/602 |

OTHER PUBLICATIONS

Sprenkle et al., A case study of automatically creating test suites from web application field data, Jul. 2006, 9 pages.*

(Continued)

*Primary Examiner* — Thuy Dao
(74) *Attorney, Agent, or Firm* — Cascio & Zervas; Anthony T. Cascio; Charles H. Jew

(57) ABSTRACT

Analytics of the recorded user interface operations at clients accessing a web application at a server are used to develop a test routine for testing the web application at a cloud service. A code module, which is either at the server or attached to the browser in each of the clients, records and correlates each of the user interface operations at each client to each action taken in the web application as it is being navigated. The module then transmits the correlated user interface operations to the test service. At the test service, analytics are performed on the correlated user interface operations to develop data from the user interface operations, from which data the test routine is constructed.

15 Claims, 1 Drawing Sheet

(56) References Cited

OTHER PUBLICATIONS

A. Sirotkin, Web Application Testing with Selenium, Apr. 2010, 8 pages.*

V. Kongsli, Security Testing with Selenium, 2007, 2 pages.*
PCT, International Search Report, Jan. 30, 2013, ISA/KR.
PCT, Written Opinion of the International Searching Authority, Jan. 30, 2013, ISA/KR.

* cited by examiner

ANALYTICS DRIVEN DEVELOPMENT

RELATED APPLICATION DATA

The present application claims priority from commonly owned U.S. Application for Provisional Patent, Application No. 61/541,040, filed Sep. 29, 2011, and is further related to commonly owned co-pending U.S. application Ser. No. 12/987,986, filed Jan. 10, 2011, all of which are incorporated herein by reference for all that they contain.

BACKGROUND OF THE INVENTION

In U.S. application Ser. No. 12/987,986, entitled Real Time Verification of Web Applications, there is described a system in which a software developer of a web application, for example a multi-page website, can test and verify the functionality of such web application on various combinations of browsers and platforms. As described therein, the developer requests through a web-based test service a specific combination of browser and platform, which combination is typically launched on a cloud server. The developer then provides the web-based service with a test, which when executed, commands the browser to access the web application and to perform a series of steps, such as navigating through various pages of the website, as specified by the test.

As the test is being performed, the results of each step of the test, which may also include screenshots of the browser, are recorded by the web-based service. Upon conclusion of the test the log files of the test and any screenshots obtained are stored, and metadata which enables access to the log files and screenshots is transmitted the developer. Upon review of the log files and screenshots, the developer can identify and correct any errors or bugs in the web application that may have arisen. The developer will typically reiterate the test on further combinations of browsers and platforms, repeating the identification and correction of errors and bugs for each respective browser/platform combination.

Although the test as described above is useful to verify the functionality of web applications as such may be accessed by various combinations of browsers and platforms and to modify such applications in view of any errors or bugs found therein, such tests are limited in that the developer executes a series of steps which the developer has standardized for testing purposes or for which the developer believes users would most likely take upon accessing the web application. However, web applications presented as complete websites may contain an indeterminable number of paths which any user could take while browsing through the content of such sites.

Testing of every possible path through all the pages of the website, although comprehensive in its results, may also be prohibitively expensive as each step in the test consumes resources provided by the cloud-based testing service thereby disadvantageously resulting in increased overhead in the resources available, especially when multiplied by the number of browser/platform combinations on which the test is to be implemented. The increased consumption of cloud resources then often results in increased cost for the developer who typically needs to pay for such cloud resources. Thus if the developer has limited monetary resources, the number of browser/platform combinations in which the website may be tested may also be limited. Accordingly, the developer must either test every possible path through the website or rely solely upon speculation as to believe that users would most likely take.

Upon each path to a new page being taken during a test of a website, there is code for each page that is executed to enable the page to be rendered properly and to provide functionality in the user interface of the browser whereby the rendered page can be actively interacted with. Generally, the more lines of code which need to be executed, the longer it typically takes a page to render properly. Thus, there are known techniques which have been developed for measuring latency in rendering web pages so that the developer can identify and revise code which detracts from the user experience due to excessive latency.

SUMMARY OF THE INVENTION

In accordance with one embodiment of the present invention, an analytics driven development system for a test routine wherein the test routine upon being developed is utilizable at a test service for the testing of a web application which is stored at a server, the system includes a user client having a browser through which the web application can be viewed at and navigated through from the user client, and a code module. The module is operative to record user interface operations which interact with the web application as the web application is being navigated and to correlate each of the user interface operations with a respective one of actions occurring in the web application in response thereto. The module is further operative to transmit the correlated user interface operations to the test service. The test service in response to receipt of the correlated user interface operations being operative to perform analytics thereon to develop data from which the test routine is constructed. In certain alternative embodiments of the present invention, the code module may either be associated with the server or with the browser.

In accordance with another embodiment of the present invention, an analytics driven development method for a test routine wherein the test routine upon being developed is utilizable at a test service for the testing of a web application which is stored at a server includes the steps of recording user interface operations which interact with the web application as the web application is being navigated by a browser at the user client, correlating each of the user interface operations with a respective one of actions occurring in the web application in response thereto, transmitting the correlated user interface operations to the test service, performing analytics at the test service on the recorded user interface operations to develop data, and constructing the test routine from the data. In certain alternative embodiments of the present invention, the recording step may be performed at the server or at the user client.

An advantage of the present invention is that the quality assurance for verification of the web application is based upon real world use of the web application instead of upon the preconceived testing done during the development stage. Other advantages of the present invention is that developers can have testing automated as a result of such analytics, achieve better effectiveness of testing, or catch errors and bugs earlier in the development cycle of the web application.

These and other objects, advantages and features of the present invention will become readily apparent to those skilled in the art from a study of the following Description of the Exemplary Preferred Embodiments when read in conjunction with the attached Drawing.

DESCRIPTION OF THE EXEMPLARY PREFERRED EMBODIMENTS

Figure 1:
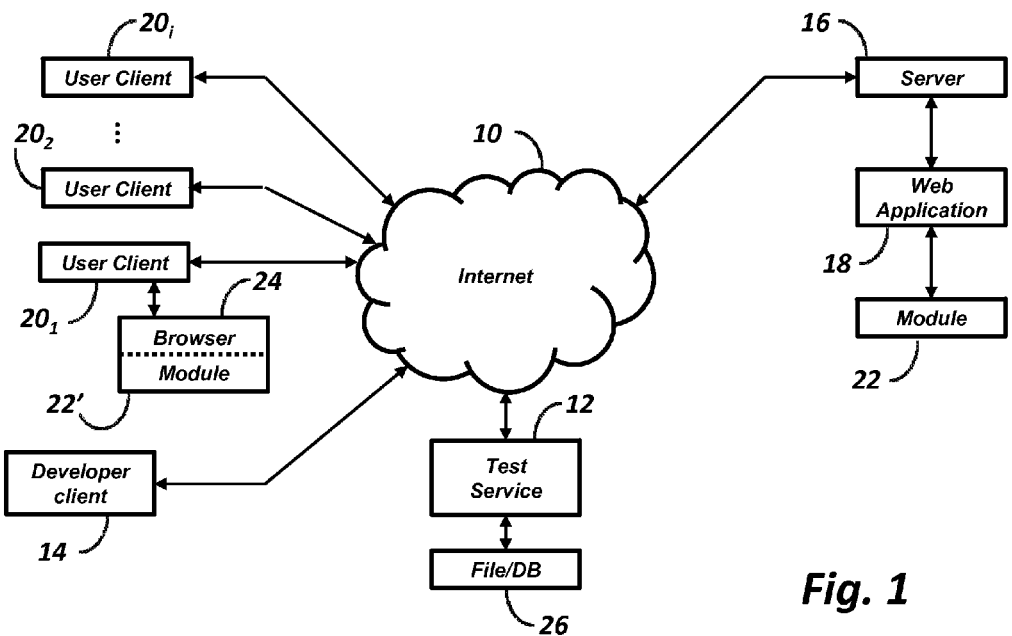
FIG. 1 is a block diagram of the system constructed according to the principles of the present invention.

Referring to FIG. 1, there is shown a system, typically operable over a network such as the Internet 10, including a test service 12, a developer client 14, a server 16 which hosts a developer web application 18, and a plurality of user clients $20_{1-i}$. The web application 18, which may typically be a website, includes a code module 22. The test service 12 may be constructed as described in the aforementioned application Ser. No. 12/987,986.

The code module 22, which in one embodiment of the present invention is normally operative at the server 16, may be enabled using known software, methods and techniques developed for the monitoring and performance analysis of websites. Accordingly, it is known that various performance metrics may be obtained as each of the user clients $20_{1-i}$ interact with the web application 18. In addition to these performance metrics, it is also known that the configuration of each of the user clients $20_{1-i}$, as to its browser/platform combination, is identifiable at the server 16.

From all of this information as may be conventionally obtained, the code module 22 can therefore monitor, capture and record interactions that each of the user clients $20_{1-i}$ make with the web application 18 through the interface of its browser 24 and correlate such interactions with the resultant actions taken by the web application 18. Further correlation to browser/platform combination may also be made.

The correlated data obtained by the code module 22 at the server 16 is then transmitted to the test service 12. The transmission of the correlated data may occur continuously as each user client clients $20_{1-i}$ is interacting with the web application 18, or it may be sent as a batch file for each respective one of the clients $20_{1-i}$ upon termination of a connection session with the web application. In either event, the correlated data is stored in log files or database 26.

In an alternative embodiment of the present invention, when one of the user clients $20_{1-i}$, for example user client $20_1$, first accesses the web application 18, the code module 22 is downloaded from the server 16 to this user client $20_1$. Upon being downloaded, the downloaded module 22' then operates in association with a web browser 24, which has been used to access the web application 18, at the user client $20_1$. Typically, the downloaded module 22' may conventionally attach as a plug in to the web browser 24.

As the user client $20_1$ is operated through the user interface of its browser 24 to navigate through the web application 18 and thereby interacts with the web application 18 during a typical connection session, the downloaded module 22', using known capture or monitoring techniques, is simultaneously recording all of the user interface operations which occur during such session at the user client $20_1$. The user interface operations may typically include each of the keystrokes, touch gestures, mouse clicks and mouse movements which occur as the client $20_1$ interacts with the web application 18, and any and all such other user interface operations as are presently or hereinafter known. Thus, use of the downloaded code module 22' may provide a greater degree of granularity in the captured data. Any or all of these user interface operations may be monitored and captured in any combination by the downloaded module 22' to record the user interface operations.

Each of the user interface operations which is recorded is further correlated, also using known techniques, by the downloaded module 22' at the user client $20_1$ with the actions occurring in the web application 18 during the connection session. Such actions may include each of the paths taken through or other such actions as may be routinely taken at the web application 18. As the data is being recorded and correlated at the user client $20_k$, it may be sent to the test service 12 in batch form upon termination of the session or continuously throughout the session.

The above described downloading of the downloaded module 22' together with the recording and correlation of data may also occur at each other of the user clients $20_{2-i}$ as these user clients $20_{2-i}$ also interact with the web application 18. The correlated data from each other of the user clients $20_{2-i}$ is also transmitted to the service 12, similarly as described above. At the service 12, the correlated data from each of the user clients $20_{1-i}$ is stored, such as in log files or other databases 26, similarly as described above.

In either embodiment of the present invention, using conventional analytics algorithms developed for purposes of analyzing web-based traffic, the data in the log files or database 26 may be analyzed to determine data from which a test routine can be developed, which test routine is to be used by the test service 12 under control of the developer client 14. Exemplarily, the data may in one embodiment of the present invention be a hierarchy of the actions occurring in the web application 18, such as a hierarchy of paths or other actions.

For example, the data may identify the most frequented paths taken through the web application 18 by all the user clients $20_{1-i}$, such as the top 10% or 20% of all such paths. From these identified paths, a Selenium test may be constructed which replicates such paths. The service may also transmit this test to the developer client 14. The developer at the developer client 14 may then implement such test on the web application 18 through the service 12 similarly as described in the above identified application.

In addition to identifying a hierarchy of paths taken, it is also possible to identify which paths as a group account for the most instances of all paths taken. Thus, out of all possible paths in the web application in which a small subset of these paths account for the paths most often taken, a measure of the instances that these paths are taken can also be obtained. For example, a small subset of paths, such as 10-30% of the total number of paths may account for greater than 85-90% of all instances of paths taken.

From this relative instance data, the code which is executed in the web application 18 can be matched these paths, also using known methods and techniques. Therefore, it is possible to identify what percentage of the code in the web application 18 is executed for the subset of paths resulting in the greatest instances of paths taken. Thus, in addition or in alternative to testing the paths based solely on hierarchy, greater efficiency in performing the test may be obtained when the test is directed to testing the code resulting from only those paths representing some threshold percentage of all instances of paths taken.

Figure 2:
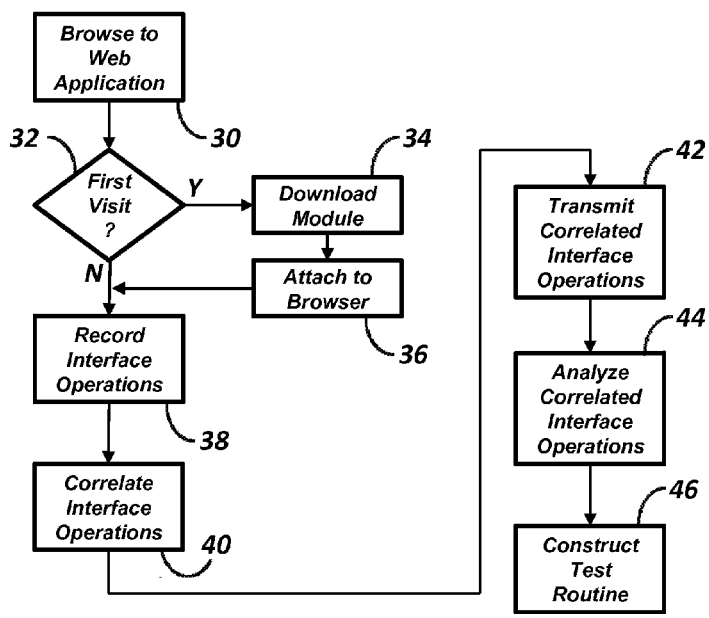
FIG. 2 is a flow chart of an exemplary method practiced in accordance with the principles of the present invention.

Referring now to FIG. 2, there is shown a flowchart of an exemplary method useful in practicing the present invention. The method of FIG. 2 may be practiced in either embodiment of the present invention, with the following caveat. In the embodiment wherein the code module 22 is operative at the server 16, the steps described below in conjunction with the downloading and installing of the module 22' are not performed, similarly as described above.

For the embodiment in which the code module 22' is downloaded and installed at any of the user clients $20_{1-i}$, as indicated at 30, any of the user clients $20_{1-i}$ individually access the web application 18 at the server 16 through use of its browser 24. If this is the first session by any of the user clients $20_{1-i}$ with the web application 18, as indicated at 32, the module 22 is downloaded, as indicated at 34 to such one of the user clients $20_{1-i}$ and the module attached, as indicated at 36, to the web browser similarly as described above.

In either embodiment of the invention, as the browser 24 at each of the user clients $20_{1-i}$ interacts with the web application, the server module 22 or the downloaded module 22' at each respective one of the user clients $20_{1-i}$ records the user interface operations, as indicated at 38, and further, as indicated at 40, correlates the interface operations similarly as described above with a respective one of actions occurring in the web application 18 in response thereto. As next indicated 42, the server module 22 or the downloaded 22' module in each of the user clients $20_{1-i}$ transmits its respective correlated interface operations to the test service 12.

Upon receiving the correlated interface operations the test service 12 analyzes such correlated interface operations, together with any other correlated interface operations received from to develop data, as indicated at 44. From the data, the test routine may be constructed as indicated as 46. The interface operations and the data may be similar to any as described above.

There has been described hereinabove novel apparatus and methods and analytics driven development. Those skilled in the art may now make numerous uses of, and departures from, the above described embodiments without departing from the inventive concepts disclosed herein. Accordingly, the present invention is to be defined solely by the lawfully permitted scope of the appended Claims.

What is claimed as the invention is:

1. An analytics driven development method to develop a test routine wherein the test routine upon being developed is stored at a test service for subsequent utilization in the testing of a web application which is stored at a server, the method comprising steps of:
    navigating the web application from a plurality of user clients wherein each of the user clients includes a browser to effect navigation of the web application;
    storing a code module selectively at the server or at each one of the user clients, the code module recording user interface operations which interact with the web application as the web application is being navigated by the browser at each of the user clients;
    correlating each of the user interface operations with a respective one of actions occurring in the web application in response thereto;
    transmitting the correlated user interface operations to the test service;
    performing analytics at the test service on the recorded user interface operations to generate data from which the test routine is developed, wherein the performing step identifies the most frequented paths taken through the web application be the user clients and wherein the test routine is a Selenium test constructed at the test service which replicates the most frequented paths; and
    accessing the test routine from a developer client which interacts with the test service to implement the routine as a navigation commands to the web application.

2. An analytics driven development method as set forth in claim 1 wherein the user interface operations include selected ones of keystrokes, touch gestures, mouse clicks and mouse movements at each of the user clients.

3. An analytics driven development method as set forth in claim 1 further comprising the step of downloading a module to one of the user clients from the server upon first access of the same one of the user clients to the web application, the module upon being downloaded becoming operational in association with the browser to perform each of the recording, correlating and transmitting steps.

4. An analytics driven development method as set forth in claim 3 wherein the module is attached as a plug in to the browser.

5. An analytics driven development method to develop a test routine wherein the test routine upon being developed is stored at a test service for subsequent utilization in the testing of a web application which is stored at a server, the method comprising steps of:
    recording user interface operations which interact with the web application as the web application is being navigated by a browser at the user client;
    correlating each of the user interface operations with a respective one of actions occurring in the web application in response thereto;
    transmitting the correlated user interface operations to the test service;
    performing analytics at the test service on the recorded user interface operations to develop data;
    constructing the test routine from the data;
    wherein the recording step includes recording user interface operations at a further user client which interact with the web application as the web application is being navigated by a browser at the further user client, wherein the step includes correlating each of the user interface operations at the further user client with a respective one of actions occurring in the web application in response thereto, wherein the transmitting step includes transmitting the correlated user interface operations of the further user client to the test service, and wherein the performing step includes performing analytics at the test service on the recorded user interface operations of each of the user client and the further user client to develop data; and
    downloading a module to the user client and to the further user client from the server upon first access respectively of each of the user client and the further user client to the web application, the module upon being downloaded becoming operational in association with the browser at each respective one of the user client and the further user client to perform each of the recording, correlating and transmitting steps.

6. An analytics driven development method as set forth in claim 5 wherein the module is attached as a plug in to the browser at the further user client.

7. An analytics driven development system to develop a test routine wherein the test routine upon being developed is electronically stored for subsequent use at a test service for the testing of a web application which is stored at a server, the system comprising:
    a plurality of user clients, each of the user clients including a browser stored in a memory through which the web application can be viewed at and navigated through from each of the user clients; and
    a code module associated with the web application, the code module being selectively stored at the server or at each one of the user clients, the code module recording user interface operations which interact with the web application as the web application is being navigated from each one of the user clients, correlating each of the user interface operations with a respective one of actions occurring in the web application in response thereto and transmitting the correlated user interface operations to the test service, the test service in response to receipt of the correlated user interface operations performing analytics thereon to generate data from which the test routine is developed, wherein the data is an identification of the most frequented paths taken through the web application by the user clients and wherein the test routine is a Selenium test constructed at the test service which replicates the most frequented paths; and a developer client which upon connection to the test service accesses the test routine and interacts with the test service so that the test routine is implemented as navigation commands to the web application.

8. An analytics driven development system as set forth in claim 7 wherein the user interface operations include selected ones of keystrokes, touch gestures, mouse clicks and mouse movements at each of the user clients.

9. An analytics driven development system as set forth in claim 7 wherein the module is stored in association with the web application at the server and downloaded to one of the user clients upon first access of the same one of the user clients to the web application, the module upon being downloaded becoming operational in association with the browser.

10. An analytics driven development system as set forth in claim 9 wherein the module attaches as a plug in to the browser.

11. An analytics driven development system as set forth in claim 7 wherein the module is operational at the server.

12. An analytics driven development system as set forth in claim 7 wherein the developer client manages execution of the test routine.

13. An analytics driven development system as set forth in claim 12 wherein metadata related to the test routine is transmitted to the developer client from which metadata the test routine is accessible at the test service.

14. An analytics driven development system to develop a test routine wherein the test routine upon being developed is utilizable at a test service for the testing of a web application which is stored at a server, the system comprising:

a user client including a browser stored in a memory through which the web application can be viewed at and navigated through from the user client;

a code module operative to record user interface operations which interact with the web application as the web application is being navigated and correlate each of the user interface operations with a respective one of actions occurring in the web application in response thereto and further operative to transmit the correlated user interface operations to the test service, the test service in response to receipt of the correlated user interface operations being operative to perform analytics thereon to develop data from which the test routine is constructed;

at least one further user client including a browser stored in a memory through which the web application can be viewed at and navigated through from the further user client; and a code module associated with the browser of the further user client and operative to record user interface operations at the further user client which interact with the web application as the web application is being navigated and correlate each of the user interface operations of the further user client with a respective one of actions occurring in the web application in response thereto and further operative to transmit the correlated user interface operations of the further user client to the test service, the test service in response to receipt of the correlated user interface operations of the further user client being operative to perform analytics on the correlated user interface operations from each of the user client and the further user client to develop data from which the test routine is constructed;

wherein the module is stored in association with the web application at the server and downloaded to each of the user client and the further user client upon first access respectively of each of the user client and the further user client to the web application, the module upon being downloaded to each of the user client and the further user client becoming operational in association with the browser at the respective one of each of the user client and the further user client.

15. An analytics driven development system as set forth in claim 14 wherein the test service includes a database in which a log file is maintained for the user interface operations at each of the user clients.

* * * * *